Jan. 30, 1940.  C. E. KRAUS  2,188,631
TREPANNING DRILL
Filed Dec. 3, 1937  2 Sheets-Sheet 1
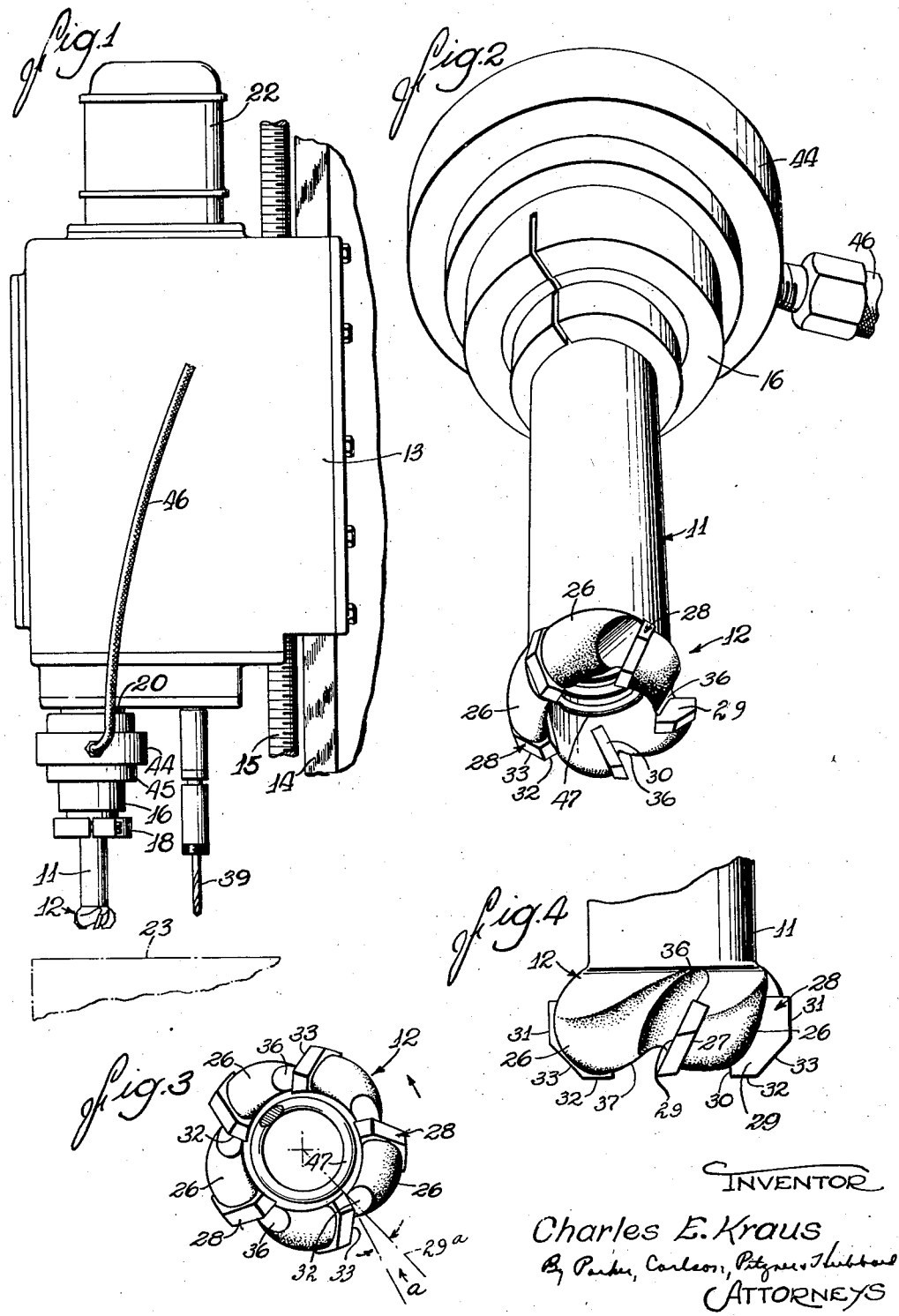
INVENTOR
Charles E. Kraus
By Parker, Carlson, Pitzner & Hubbard
ATTORNEYS Jan. 30, 1940.  C. E. KRAUS  2,188,631
TREPANNING DRILL
Filed Dec. 3, 1937  2 Sheets-Sheet 2
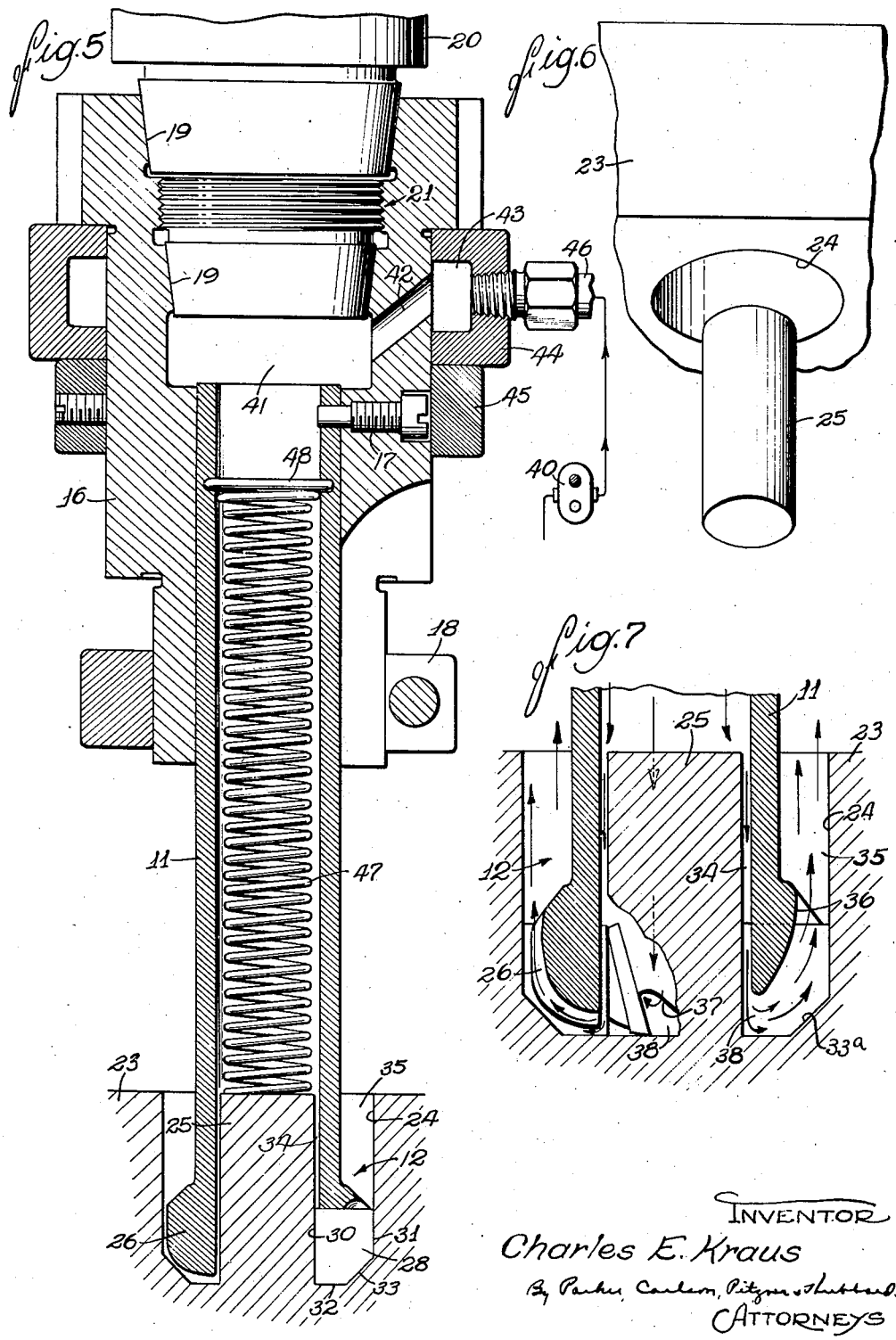
INVENTOR
Charles E. Kraus
By Parker, Carlson, Pitzner & Hubbard
ATTORNEYS Patented Jan. 30, 1940

2,188,631

UNITED STATES PATENT OFFICE 2,188,631

TREPANNING DRILL

Charles E. Kraus, Rockford, Ill., assignor to The Ingersoll Milling Machine Company, Rockford, Ill., a corporation of Illinois Application December 3, 1937, Serial No. 177,905

6 Claims. (Cl. 77—69)

The invention relates to drilling or boring machines known as trepanning drills by which relatively large holes are bored by cutting an annular aperture through a work piece.

The general object of the present invention is to provide an improved form of trepanning drill which may be effectively operated at higher rates of feed than similar drills heretofore used and this, without danger of overheating or breaking the tool.

A more specific object is to provide a trepanning drill constructed in a novel manner such as to provide passages by which liquid coolant may be directed around the cutting edges not only to cool the parts effectually but to continuously wash away the chips being formed, even during drilling of a relatively deep hole.

Other objects and advantages of the invention will become apparent from the following detailed description taken in connection with the accompanying drawings, in which Figure 1 is a fragmentary side elevation of a drilling machine embodying the present invention.

Fig. 2 is a perspective view of the trepanning drill and its mounting.

Figs. 3 and 4 are respectively bottom and side elevations of the cutter proper.

Fig. 5 is a longitudinal sectional view of the trepanning drill and mounting.

Fig. 6 is a perspective view of the lower side of a drilled work piece and the plug cut therefrom.

Fig. 7 is an enlarged detail section through the cutter slightly in advance of one of its cutting faces.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

The drill shown in the drawings comprises an elongated tubular shank 11 and a cutter head 12 rigid with the lower end of the shank. The other end of the shank is mounted detachably on a tool head 13 slidable along ways 14 and adapted to be reciprocated by a power driven screw 15 or other well known feeding mechanism. Herein, the shank is received in the end of an elongated sleeve 16 and secured thereto as by dog-point set screws 17 and by a collar 18 contracted around the lower split end of the sleeve. The upper end of the sleeve is tapered at 19 to fit onto the end of a spindle 20 to which the sleeve is threaded as indicated at 21. The spindle is journaled in the head 13 and rotated by means including an electric motor 22.

The present invention contemplates construction of the cutter 12 such that the annulus of metal which is removed from the work piece to form the hole 24 and the central plug 25 is of a radial width substantially greater than the wall thickness of the shank 11. For this purpose, annularly spaced projections 26 are formed integral with the shank at the lower end thereof. The face 27 of each projection is substantially flat and provides a rigid backing for the major portion of a separately formed blade 28. Preferably, the latter is composed of wear-resistant cutting material such as tungsten carbide and is permanently fastened to the projection face 27 as by brazing.

The cutting face 29 of each blade is inclined to provide the desired rake angle. The cutting edge includes an inner side portion 30 extending generally longitudinally of the cutter axis (Fig. 5) and is spaced inwardly from the internal wall of the tubular shank 11. The outer side edge portion 31 is parallel to the portion 30 but is spaced a substantially greater distance away from the outer wall of the shank. The end of the blade is divided into a portion 32 substantially normal to the edge portion 30 and an inclined portion 33 connecting the edge portions 31 and 32.

As shown in Fig. 3, the blades 28 are disposed so that each entire face 29 is behind a radius 29a extending through the innermost point on the end edge 32 which therefore is disposed at a shear angle $a$. Therefore, the sign of this angle is such as to induce the flow of chips by this edge outwardly. This tendency, coupled with a similar action by the beveled edge 33 and the presence of the beveled work surface 33a (Fig. 7) formed by the latter edge, provides for positive outward and then upward flow of the chip sections formed by both edges 32 and 33 through the narrowest portions of the chip passages. The chips, even when substantially unbroken, as will be the case in the cutting of steel, are caused to flow along paths which facilitate their effective removal by liquid coolant as will be described later.

As the cutter while rotating is fed axially into the work to form the annular recess 24, it will be observed from Fig. 5 that a coolant inlet passage 34 is formed between the plug 25 and the internal wall of the shank 11. This extends entirely around the plug and therefore is capable of conducting the large volume of coolant required for washing out chips effectively. The chip and coolant outlet passage 35 also extends entirely around the shank. This passage is substantially wider than the inlet passage so as to facilitate the removal of the chips and avoid possible danger of clogging.

In addition to providing a rugged backing for the blades, the projections 26 are specially shaped to direct the coolant supplied through the hollow shank across the cutting faces of the blades in a novel manner such as to wash the chips effectively into the outlet passage 35. To this end, each projection tapers circumferentially away from the blade supported thereby in a direction opposite to the rotation of the cutter and the trailing portion is cut inwardly at a point spaced from the next succeeding blade so as to form a curved surface 36 defining a groove disposed immediately in advance of said next edge and extending generally longitudinally of the cutter shank and parallel to the blade face. Also, the axially facing side of each projection is undercut as indicated at 37 so as to provide an enlarged recess 38 establishing communication between the inner coolant passage 34 and the lower end of the groove 36. The inner sides of the blades 28 project through these recesses.

With the cutter head shaped as described above, the major portion of the coolant flowing downwardly along the annular inlet passage 34 is induced to flow outwardly through the recesses 38 and then upwardly across the faces of the blades through the channel defined by the groove 36, the face of the blade and the internal surface of the bore 24. Owing to the size of the grooves and the manner in which the coolant flow is thus concentrated, chips forming at the cutting edges are continuously forced upwardly into the outlet 35 and any possibility of the passages becoming clogged is eliminated. It will also be observed that the coolant channels are designed to cause a flow to all parts of the blade edges sufficient to effect proper cooling, the major portion, however, being directed along the faces of the blades and utilized advantageously for chip removal.

By washing away the chips continuously as contemplated by the present invention, deeper holes can be bored than with trepanning drills heretofore used in practice wherein the depth of the hole was limited by the available chip space within the cutter itself. Moreover, with the improved construction, a feed rate comparable to that used in drilling small holes may be employed. Accordingly, it is possible to bore large and small holes simultaneously simply by mounting the improved trepanning drill and ordinary drills 39 on a common multiple spindle head as shown in Fig. 1. A substantial saving in machine tool equipment may thus be effected.

During a drilling operation, liquid coolant for washing out chips in the manner described above is supplied under pressure by a suitable external source 40 and delivered to the cutter proper through the tubular shank 11. For this purpose, the upper end of the shank communicates with a chamber 41 which is connected through outwardly extending ports 42 with an annular collector chamber 43 defined by the sleeve 16 and a non-rotatable ring 44 encircling the latter between a shoulder and a ring 45 fixed to the sleeve. Coolant from the source is supplied continuously to the chamber 43 through a connection with a hose 46.

Preferably, means is provided for assisting the ejection of the plug 25 as the drill has broken through the work. Herein, this means comprises a coiled spring 47 arranged within the shank 11 and acting in compression between an anchor ring 48 and upper end of the plug 25.

I claim as my invention:

1. A trepanning drill having, in combination, a rotatable tubular shank, annularly spaced projections formed integral with the end of said shank and providing radially extending abutments, each of said projections tapering circumferentially away from its abutment whereby to form a chip outlet groove disposed in advance of the next succeeding abutment and extending generally longitudinally of said shank, said projections also being undercut to define axially facing recesses establishing communication between the interior of said shank and the outer ends of said grooves, separately formed cutter blades secured to and backed by said abutments and projecting through said recesses, each of said blades having an axially facing end edge, one side edge radially spaced inwardly from the inner wall of said shank, a second side edge radially spaced outwardly a substantial distance from the outer wall of said shank, and means for continuously supplying coolant under pressure to the interior of said shank whereby to cause a flow of coolant between said inner wall and the plug cut from the work, through said recesses and then reversely along said grooves and the cutting faces of said blades into the annular space between said outer wall and the bore being formed.

2. A trepanning drill having, in combination, a rotatable hollow tool shank, an annular cutter head of greater diameter than said shank mounted on one end thereof and carrying a plurality of spaced laterally projecting cutter blades, said head having generally longitudinally extending grooves formed in the outer face thereof adjacent the leading edges of said blades and communicating at their outer ends with the interior of said cutter head and shank through axially facing notches formed in the lower end of the head, and means for continuously supplying a high velocity stream of liquid coolant through said hollow shank to the cutter head end thereof, said coolant discharging through said notches and grooves and effectually washing away the chips formed by said blades.

3. A trepanning drill having, in combination, a rotatable tubular shank, an enlarged cutter head on the outer end of said shank, and generally radially disposed blades on said head each having an axially facing end cutting edge, inner and outer side cutting edges extending generally longitudinally of the shank and respectively spaced inwardly and outwardly from the inner and outer walls of said shank, and a fourth edge connecting said end and outer edges and inclined relative thereto so as to face outwardly.

4. A trepanning drill having, in combination, a rotatable tubular shank, annularly spaced projections on the end of said shank and providing radially disposed abutments, each of said projections tapering circumferentially away from its abutment whereby to form a longitudinally extending chip outlet groove in advance of the next succeeding abutment, and said projections also being undercut to define axially facing recesses establishing communication between the interior of said shank and the outer ends of said grooves, and separately formed cutter blades secured to and backed by said abutments and projecting through said recesses, each of said blades having an axially facing end edge, one side edge radially spaced inwardly from the inner wall of said shank, and a second side edge radially spaced outwardly a substantial distance from the outer wall of said shank.

5. A trepanning drill having, in combination, a rotatable tubular shank and teeth annularly spaced around and projecting from one end of said shank and each having an axially facing end cutting edge, inner and outer side cutting edges extending generally longitudinally of said shank and respectively spaced inwardly and outwardly from the inner and outer walls thereof, and a beveled edge connecting said end and outer side edges and inclined outwardly and backwardly from said end edge, each of said teeth having its cutting face disposed at a shear angle such as to induce the chip portion cut by said end edge to flow outwardly and then reversely along the inclined work surface formed by said beveled edge.

6. A trepanning drill having, in combination, a rotatable tubular shank and teeth annularly spaced around and projecting from one end of said shank and each having an axially facing end cutting edge, inner and outer side cutting edges extending generally longitudinally of said shank and respectively spaced inwardly and outwardly from the inner and outer walls thereof, and a beveled edge connecting said end and outer side edges and inclined outwardly and backwardly from said end edge, said end edge being disposed behind a radius through the innermost part of such end edge so that the latter and said beveled edge trail such radius in the rotation of the drill.

CHARLES E. KRAUS.